Nov. 7, 1961     F. M. RYCK     3,007,190
CONNECTOR FOR WINDSHIELD WIPER BLADE
Filed Sept. 16, 1957

INVENTOR.
Francis M. Ryck
BY
*M. H. Strickland*
His Attorney

United States Patent Office 3,007,190
Patented Nov. 7, 1961

3,007,190
CONNECTOR FOR WINDSHIELD WIPER BLADE
Francis M. Ryck, Rochester, N.Y., assignor to General Motors Corporation, Detroit, Mich., a corporation of Delaware
Filed Sept. 16, 1957, Ser. No. 684,033
4 Claims. (Cl. 15—250.32)

This invention pertains to windshield cleaners, and particularly to a connector on a wiper blade for attachment to a wiper arm.

At the present time, straight end wiper arms are being used on some windshield cleaners to minimize the twisting or rotating movement between the blade connector and the arm, and thus prevent contact between the metal parts of the blade assembly and the glass. The present invention relates to a connector for a straight end arm including readily releasable locking means for securely retaining the arm in assembled relation with the blade connector. Moreover, the locking means are so designed that any movement in a direction tending to disengage the arm and connector without manually releasing the locking means increases the locking force. Accordingly, among our objects are the provision of an improved connector for detachably connecting a wiper blade and a wiper arm; the further provision of a locking spring for a connector; the further provision of a connector designed for use with a straight end arm; and the still further provision of a connector including a releasable spring lock.

The aforementioned and other objects are accomplished in the present invention by embodying a locking spring in the connector, the locking spring being so located that relative movement between the arm and the connector in a direction tending to disengage the arm from the connector automatically results in increasing the locking force applied by the spring. Specifically, the connector is particularly adaptable for use with a flexible wiper blade assembly including a pressure distributing linkage of any suitable type. The connector is pivotally attached to the pressure distributing linkage on an axis extending transversely of the blade. The connector comprises a generally channel shaped member having a pair of slots in the top wall thereof and a plurality of longitudinally spaced inwardly extending fingers disposed beneath the top wall thereof.

A flat spring having an angularly disposed end portion extends through one of the slots in the top wall of the connector, the other end of the flat spring being locked to the connector through the other slot. The angularly disposed end portion of the flat spring has an aperture therein, such that when the angularly arranged end portion of the spring is deflected so as to be substantially normal to the longitudinal axis of the arm, the arm may be readily extended through the aperture locking spring. Thus, while in the specific embodiment disclosed herein, the spring is shown having a substantially D-shaped aperture so as to accommodate an arm having a substantially D-shaped end, this embodiment is only by way of example and not by way of limitation, since the only requirement is that the configuration of the aperture on the spring be similar to the configuration of the cross section of the arm end. After the end of the arm is inserted through the aperture of the locking spring, during which movement the spring is automatically moved to a position substantially normal to the axis of the arm, any retracting movement of the arm causes the spring to bite into the arm thereby locking it in place. The end of the angularly disposed portion of the spring is disposed between two pairs of the fingers, or tabs, of the connector disposed beneath the top wall thereof, the fingers positively limiting movement of the end of the locking spring in both directions.

To remove the arm from the socket, the spring must be manually deflected to a position wherein the angularly disposed end thereof is substantially normal to the axis of the arm, whereupon the clamping or locking action of the spring is removed.

Further objects and advantages of the present invention will be apparent from the following description, reference being had to the accompanying drawing, wherein a preferred embodiment of the present invention is clearly shown.

Figure 1:
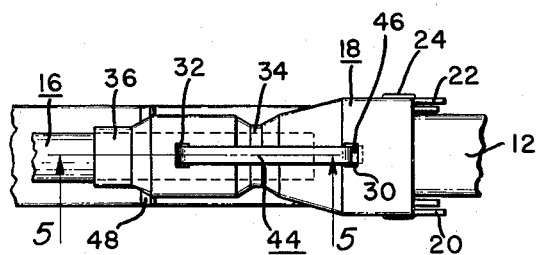
FIGURE 1 is a fragmentary view, in elevation, of a wiper blade and arm assembly including the connector of this invention.
Figure 2:
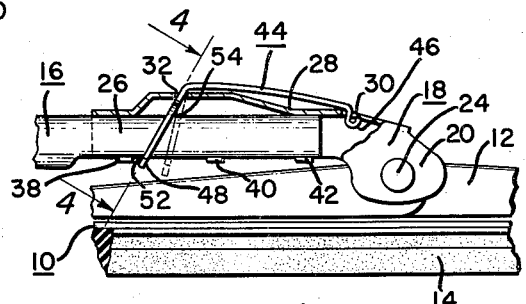
FIGURE 2 is a fragmentary view, partly in section and partly in elevation, of a wiper arm and blade assembly including the connector of this invention.
Figure 5:
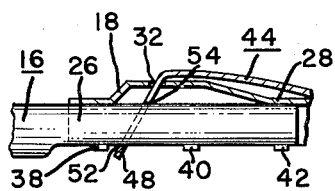
FIGURE 5 is a sectional view taken along line 5—5 of FIGURE 1.

With particular reference to FIGURES 1 and 2, a cleaner assembly is shown including a flexible wiper blade assembly 10, which includes a pressure distributing linkage 12 and a squeegee unit 14. The cleaner assembly also includes a wiper arm 16, which may be a conventional two-part construction whereby the outer arm section is spring urged towards the windshield to apply wiping pressure to the blade assembly 10. The arm 16 and the blade 10 are interconnected by a connector 18 of substantially channel shape, and having side portions 20 and 22 pivotally attached to the pressure distributing linkage 12 by means of a rivet 24. The axis of the rivet 24, hence the axis of pivotal movement of the connector 18, is located transversely to the longitudinal axis of the blade assembly 10.

The connector 18 is designed to accommodate a straight end arm portion indicated by the numeral 26, and, as shown, the connector is composed of sheet metal having a top wall formed with a pair of spaced slots 32 and 30. In addition, as shown in FIGURE 1, side walls 20 and 22 of the connector are deformed in areas 34 and 36 so as to snugly receive and support the straight end arm portion 26. In addition, the side walls 20 and 22 of the connector have a plurality of inwardly extending fingers, or tabs, 38, 40 and 42 extending beneath the end portion 26 of the wiper arm. The tabs 38, 40 and 42 are in pairs, and extend towards each other from the opposite side walls 20 and 22, although terminating short of engagement with each other.

Figure 3:
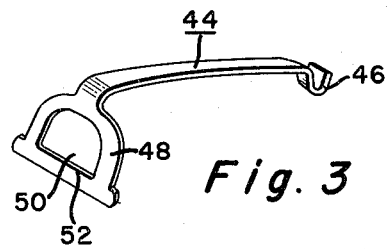
FIGURE 3 is a perspective view of the locking spring.
Figure 4:
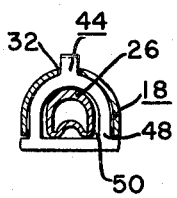
FIGURE 4 is a sectional view taken along line 4—4 of FIGURE 2.

The improved locking device of this invention comprises a generally flat spring 44, as shown in FIGURE 3. The flat spring 44 has a hooked end 46 and an angularly arranged end portion 48 having an aperture 50 therein. The spring 44 is assembled in the connector, or socket, 18 by inserting the hooked end 46 through the slot 32 from the bottom side, and thereafter forcing the hooked end 46 into the slot 30 whereby the hooked end 46 will securely retain spring 44 in assembled relation with the connector 18, as shown in FIGURE 2. With reference to FIGURE 4, the end portion 26 of the arm 16 is of substantially D-shape configuration and cross section and the configuration of the cross section of the arm portion 26 corresponds generally to the shape of the aperture 50 in the spring 44 although slightly larger. It is specifically pointed out that the particular shape of the aperture 50 in the spring 44 is shown only by way of example. Thus, if the end portion of the arm is rectangular, the aperture in the spring will be substantially rectangular. Likewise, if the cross section of the arm is round or triangular, the aperture in the locking spring will be of a complementary nature.

To assemble the arm with the connector 18, the end portion 26 of the arm 16 is inserted into the open end of the connector 18 and forced through the aperture 50 of the locking spring. During insertion of the arm end, the end portion 48 of spring 44 will be deflected to the dotted line shown in FIGURE 2, wherein it is substantially normal to the longitudinal axis of the arm so that the arm can be freely inserted through the spring aperture. The lower portion of the arm is supported by the pairs of tabs 38, 40 and 42. However, as soon as the force applied to the arm to insert the arm into the connector is removed, the end portion 48 of the spring will assume the position shown in FIGURE 2, i.e., oblique to the axis of the arm, wherein edges 52 and 54 of the spring will bite into the end portion 26 of the arm if a force is applied to the arm tending to withdraw the arm from the connector. Moreover, the locking force of the spring 44 restraining withdrawal of the arm from the connector is directly proportional to the force applied to the arm. In order to remove the arm from the socket, the end portion 48 of the spring must be moved to the dotted line position shown in FIGURE 2 so that it is substantially normal to the longitudinal axis of the blade. Thereupon, the arm can be freely removed from the socket since the aperture 50 in the spring is of slightly larger cross sectional area than the cross sectional area of the arm, and when the end portion 48 is normal or substantially normal, to the axis of the arm, the aperture is aligned with the arm.

From the foregoing it is readily apparent that the present invention provides a quick detachable connector designed for use with straight end arms. Moreover, the locking means incorporated in the connector resist withdrawal of the arm from the connector with a force proportional to the force tending to separate the arm and the connector.

While the embodiment of the invention as herein disclosed constitutes a preferred form, it is to be understood that other forms might be adopted.

What is claimed is as follows:

1. A connector for establishing a detachable connection between a windshield wiper blade and a wiper arm including, a socket member having an open end designed to receive an entering part during assembly, and a locking spring carried by said socket member, said locking spring having an aperture therein of larger cross-sectional area than said entering part, the edges of said aperture being engageable with said entering part to prevent withdrawal thereof, one end of said locking spring having a hook extending through a slot in said socket member for securely attaching the locking spring to said socket member, the other end of said locking spring being angularly related to said one end and extending through a second slot in said socket member, said locking spring being manually deflectable to permit withdrawal of the entering part.

2. A connector for establishing a detachable connection between a windshield wiper blade and a wiper arm including, a socket member having an open end adapted to receive an entering part during assembly, and a locking spring carried by said socket member, said locking spring having an elongate portion and an enlarged portion with an aperture of larger cross-sectional area than said entering part, the elongate portion of said locking spring engaging said socket member for securely attaching the locking spring to said socket member and the enlarged portion of said locking spring being angularly disposed in said socket member adjacent the open end thereof such that the edges of said aperture are engageable with said entering part to prevent unauthorized withdrawal thereof, said enlarged portion being manually deflectable to permit withdrawal of the entering part.

3. A connector for establishing a detachable connection between a windshield wiper blade and a wiper arm including, a socket member connected to said blade having an open end adapted to receive the end of said wiper arm during assembly, and a locking spring carried by said socket member having an enlarged portion with an aperture therein angularly disposed in said socket member adjacent the open end thereof and an elongate portion secured to said socket member adjacent the other end thereof, said aperture being of larger cross-sectional area than the end of said wiper arm with its edges being engageable with said wiper arm to prevent unauthorized withdrawal thereof, said locking spring being manually deflectable to permit withdrawal of the wiper arm.

4. A connector for establishing a detachable connection between a windshield wiper blade and a wiper arm including a socket member having an open end adapted to receive the end of the wiper arm during assembly and having an enlarged portion spaced from said open end thereof, and a locking spring having an elongate portion at one end thereof and an enlarged portion at the other end thereof with an aperture therein of larger cross-sectional area than said wiper arm, the elongate portion of said locking spring having a hook extending through a slot in said socket member for securely attaching the locking spring to said socket member and the enlarged end of said locking spring being angularly disposed in the enlarged portion of said socket such that the edges of said aperture are engageable with the end of said wiper arm to prevent unauthorized withdrawal thereof, said enlarged portion being manually deflectable to permit withdrawal of the wiper arm.

References Cited in the file of this patent

UNITED STATES PATENTS

| | | |
|---|---|---|
| 813,047 | King | Feb. 20, 1906 |
| 1,998,759 | Horton | Apr. 23, 1935 |
| 2,203,346 | Anderson | June 4, 1940 |
| 2,566,886 | Hartman | Sept. 4, 1951 |
| 2,597,368 | Page | May 20, 1952 |
| 2,694,827 | Bacher | Nov. 23, 1954 |
| 2,716,252 | Mackie et al. | Aug. 30, 1955 |
| 2,751,620 | Ehrlich | June 26, 1956 |
| 2,801,436 | Scinta | Aug. 6, 1957 |
| 2,807,822 | Scinta | Oct. 1, 1957 |